US010676595B2

(12) United States Patent
Choi et al.

(10) Patent No.: US 10,676,595 B2
(45) Date of Patent: Jun. 9, 2020

(54) METHODS FOR COMBINING THERMOPLASTIC POLYMER WITH CARBON NANOMATERIAL

(71) Applicant: LG CHEM, LTD., Seoul (KR)

(72) Inventors: Yeon Sik Choi, Daejeon (KR); Su Min Lee, Daejeon (KR); Chang Hun Yun, Daejeon (KR); Gi Dae Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/274,652

(22) Filed: Feb. 13, 2019

(65) Prior Publication Data
US 2019/0177509 A1   Jun. 13, 2019

Related U.S. Application Data

(62) Division of application No. 14/419,423, filed as application No. PCT/KR2014/008016 on Aug. 28, 2014, now Pat. No. 10,266,675.

(30) Foreign Application Priority Data

Sep. 2, 2013  (KR) .................. 10-2013-0104594
Sep. 2, 2013  (KR) .................. 10-2013-0104906

(51) Int. Cl.
*C08K 7/06*  (2006.01)
*C08K 5/09*  (2006.01)
(Continued)

(52) U.S. Cl.
CPC .................. *C08K 7/06* (2013.01); *B29B 9/16* (2013.01); *C08J 7/06* (2013.01); *C08K 3/041* (2017.05);
(Continued)

(58) Field of Classification Search
CPC ..... B29B 2009/163; B29B 9/16; B29B 9/163; C08K 5/09; C08K 5/095; C08K 5/17;
(Continued)

(56) References Cited

U.S. PATENT DOCUMENTS 9,776,874 B1    10/2017  Drzal .................. C01B 31/0423
2004/0016912 A1  1/2004  Bandyopadhyay et al.
(Continued)

FOREIGN PATENT DOCUMENTS

CN    10802712 A     7/2006
CN    101573404 A   11/2009
(Continued)

OTHER PUBLICATIONS

Bahun et al., "Solubilizing Single-Walled Carbon Nanotubes with Pyrene-Functionalized Block Copolymers," J. Polym. Sci. Part A, 44, 1941-1951 (2006).
(Continued)

*Primary Examiner* — Kregg T Brooks
(74) *Attorney, Agent, or Firm* — Dentons US LLP

(57) ABSTRACT

Disclosed are methods for combining a thermoplastic polymer with a carbon nanomaterial. More particularly, A method of preparing a thermoplastic polymer combined with a carbon nanomaterial includes combining the carbon nanomaterial with a pyrene derivative by stirring 1 to 40 wt % of a carbon nanomaterial, 1 to 40 wt % of a polycyclic aromatic hydrocarbon derivative, and 20 to 98 wt % of a solvent with a mechanical mixer. According to the present invention, the resulting materials exhibit excellent tensile strength, tensile modulus, electromagnetic shielding effects and anti-static effects, and the like.

10 Claims, 1 Drawing Sheet

(51) Int. Cl.
    C08K 7/24      (2006.01)
    B29B 9/16      (2006.01)
    C08K 5/05      (2006.01)
    C08K 5/10      (2006.01)
    C08K 5/20      (2006.01)
    C08K 5/22      (2006.01)
    C08K 3/04      (2006.01)
    C08J 7/06      (2006.01)
    C08L 77/02     (2006.01)
    C08L 77/06     (2006.01)

(52) U.S. Cl.
    CPC .................. *C08K 5/05* (2013.01); *C08K 5/09*
         (2013.01); *C08K 5/10* (2013.01); *C08K 5/20*
         (2013.01); *C08K 5/22* (2013.01); *C08K 7/24*
         (2013.01); *B29B 2009/163* (2013.01); *C08J
         2377/00* (2013.01); *C08K 3/042* (2017.05);
         *C08K 3/046* (2017.05); *C08K 2201/011*
         (2013.01); *C08L 77/02* (2013.01); *C08L 77/06*
                                               (2013.01)

(58) Field of Classification Search
    CPC ............ C08K 2201/011; C01B 32/168; C01B
              32/174; C07C 15/20–38; C08L 77/00–12;
                        C09D 177/00–12; C09J 177/00–12
    See application file for complete search history.

(56)           References Cited

U.S. PATENT DOCUMENTS

2006/0189822 A1    8/2006  Yoon ...................... B82Y 30/00
                                                          560/130

2011/0162410 A1    7/2011  Low ........................ C08J 9/127
                                                          62/532
2012/0053288 A1    3/2012  Morishita et al.
2012/0104329 A1    5/2012  Meyer et al.

FOREIGN PATENT DOCUMENTS

CN         101717540 A       6/2010
CN         102348731 A       2/2012
CN         102585425 A       7/2012
EP          2881428 A1       6/2015
JP        2010-515779        5/2010
JP         2012-46582        3/2012
KR       10-2007-0102266    10/2007
KR         10-0926967       11/2009
KR       10-2011-0125529 A  11/2011
KR       10-2012-0023490     3/2012
KR         10-1161715        7/2012
KR       10-2013-0049444     5/2013
KR       10-2013-0049444 A   5/2013
KR       10-2014-0026442 A   3/2014
WO         2004040590 A2     5/2004
WO         2008/046010 A2    4/2008
WO         2012/138632 A2   10/2012

OTHER PUBLICATIONS

Machine translation of KR 10-2013-0049444 A.
J. Nanosci. Noanotechnol., 2012, 12 (3), p. 1717-1738.
Polymer Journal, 2008. 40(7), p. 577-589.
Polymer Preprints, Japan, 2011, 60(2), p. 3973.
Polymer Preprints, Japan 2012, 61(1), p. 616.
19th Polymer Material Forum , 2010, 19 p. 129-130.
R. Chen et al., J. Am. Chem. Soc. 2001 vol. 123: pp. 3838-3839, Apr. 18, 2001.

METHODS FOR COMBINING THERMOPLASTIC POLYMER WITH CARBON NANOMATERIAL

This application is divisional application of U.S. patent application Ser. No. 14/419,423, filed on Feb. 3, 2015, which is a 35 USC § 371 National Stage entry of International Application No. PCT/KR2014/008016, filed on Aug. 28, 2014, which claims priority to and the benefits of Korean Patent Application No. 10-2013-0104594, filed on Sep. 2, 2013 and Korean Patent Application No. 10-2013-0104906, filed on Sep. 2, 2013, all of which are hereby incorporated herein by reference in their entirety as if fully set forth herein.

FIELD

The present invention relates to a thermoplastic polymer combined with a carbon nanomaterial and a method of preparing the same. More particularly, the present invention relates to a thermoplastic polymer combined with a carbon nanomaterial having excellent tensile strength, tensile modulus, electromagnetic shielding effects and anti-static effects, and a method of preparing the same on a large scale.

BACKGROUND

Carbon nanomaterials may be applied to a variety of fields such as electronic devices, sensors, high-performance composites, and the like due to excellent mechanical properties, electrical selectivity and field emission characteristics thereof.

In particular, since carbon nanomaterials of nanocomposites have nano-size particles, mechanical performance and electrical performance such as strength, wear resistance, or the like may be considerably improved using a small amount of the carbon nanomaterials without any property loss, when the carbon nanomaterials are well dispersed in a polymer matrix.

However, in spite of predicted superior properties of the carbon nanomaterials, mechanical performance or electrical performance of presently prepared carbon nanomaterial composites falls very short of expectations. Such a phenomenon is caused by two elements, namely, dispersion of carbon nanomaterials and compatibility, adhesion, or wetting of nanotubes and polymers.

Carbon nanomaterials have strong electrostatic attraction and thus it is difficult to uniformly disperse the nanomaterials in a polymer matrix. Recently, as a method to effectively disperse the carbon nanomaterials, a method of treating the nanomaterials with ultrasonic waves and the like have been developed and broadly used. However, the carbon nanomaterials are damaged according to intensity of ultrasonic waves and time and thus it is difficult to maintain superior properties and characteristics thereof, and, accordingly, it is difficult to apply the nanomaterials to large-scale production.

In addition, compatibility of the carbon nanomaterials with broadly used thermoplastic polymers is dramatically low, when compared with surface-treated glass fiber or carbon fiber, which are presently used. This is since a portion of a nanotube surface may not interact with thermoplastic polymers. To resolve such a problem, a surface-treatment method through acid treatment and a method of coating noncovalent bonding materials using π-π interaction have been suggested. However, it is difficult to commercialize the methods due to a complex process procedure and high material costs.

SUMMARY

Therefore, the present invention has been made in view of the above problems, and it is one object of the present invention to provide a thermoplastic polymer combined with a carbon nanomaterial having excellent tensile strength, tensile modulus, electromagnetic shielding effects and anti-static effects, and a method of preparing the same in a large scale.

All of the above and other objections may be accomplished by descriptions disclosed below.

In accordance with one aspect of the present invention, provided is a thermoplastic polymer combined with a carbon nanomaterial, comprising 0.025 to 30 wt % of a polycyclic aromatic hydrocarbon derivative and 55 to 99.875 wt % of a thermoplastic polymer, wherein the carbon nanomaterial and the polycyclic aromatic hydrocarbon derivative are combined by π-π interaction, and the polycyclic aromatic hydrocarbon derivative is covalently combined with the thermoplastic polymer.

In accordance with another aspect of the present invention, the present invention provides a method of preparing a thermoplastic polymer combined with a carbon nanomaterial, the method comprising a) combining a pyrene derivative with the carbon nanomaterial by stirring 1 to 40 wt % of the carbon nanomaterial, 1 to 40 wt % of a polycyclic aromatic hydrocarbon derivative, and 20 to 98 wt % of a solvent using a mechanical mixer; and b) coating a polymer pellet with the carbon nanomaterial combined with the polycyclic aromatic hydrocarbon derivative.

As apparent from the fore-going, the present invention advantageously provides a thermoplastic polymer combined with a carbon nanomaterial having excellent tensile strength, tensile modulus, electromagnetic shielding effects and anti-static effects, and a method of preparing the same on a large scale.

The MWCNT having PBA combined by π-π interaction exhibits a high $O_{1s}$ peak, when compared with pristine MWCNT, and the MWCNT having PBC combined by π-π interaction exhibits a high $Cl_{2p}$ peak. Through this, it can be confirmed that introduction of a reactive group by noncovalent combination (π-π interaction) onto a surface of the MWCNT has been successfully performed.

In addition, the MWCNT having nylon 6,6-g-pyrene combined by π-π interaction exhibits only $N_{1s}$ peak without a $Cl_{2p}$ peak. Through this, it can be confirmed that introduction of a polymer by noncovalent combination (π-π interaction) onto a surface of the MWCNT has been successfully performed.

Figure 1:
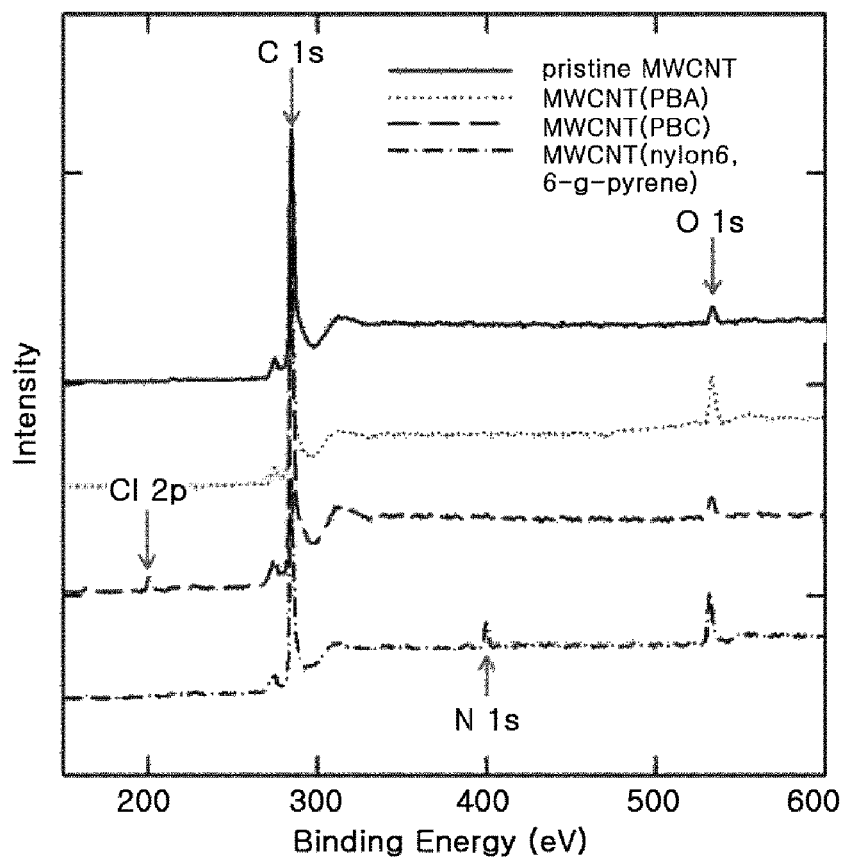
FIG. 1 illustrates ESCA (XPS) spectra of pristine MWCNT, MWCNT (Example 1) having PBA combined by π-π interaction, an MWCNT (Example 2) having PBC combined by π-π interaction, and an MWCNT (Example 2) having nylon 6,6-g-pyrene combined by π-π interaction.
Figure 2:
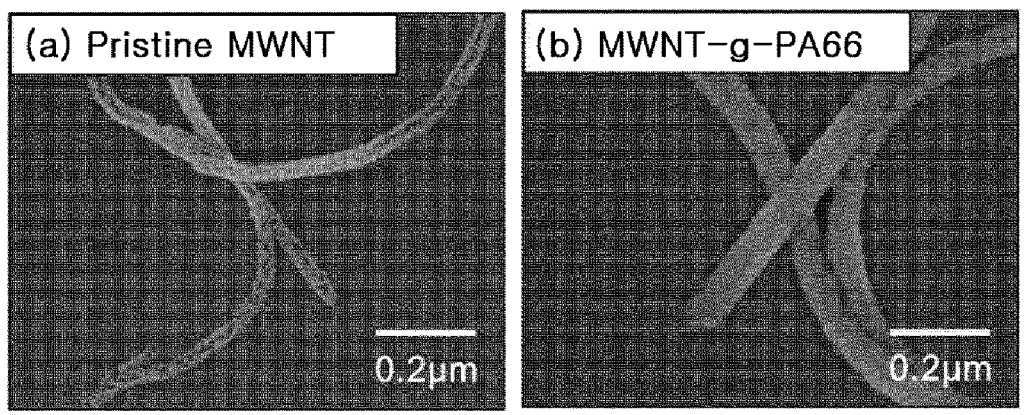

FIG. 2 illustrates an SEM image taken after mixing and extruding (Comparative Example 2) nylon 6,6 and pristine MWCNT, and then treating the same with formic acid, and an SEM image taken after extruding an MWCNT having nylon 6,6-g-pyrene combined by π-π interaction and then treating the same with formic acid.

When the nylon 6,6 and the pristine MWCNT were mixed and extruded (Comparative Example 2), and then treated with formic acid, all of the nylon 6,6 attached to a surface of the MWCNT was removed and thus a thin thread type such as pristine MWCNT was observed. However, when the MWCNT having nylon 6,6-g-pyrene combined by π-π interaction was extruded and then treated with formic acid, the nylon 6,6-g-pyrene existed on a surface of the MWCNT as it was and thus a bar type having a smooth surface and a thick diameter was observed. Through this, it can be confirmed that the nylon 6,6-g-pyrene and the MWCNT strongly combine through π-π interaction.

The nylon 6,6-g-pyrene according to the present invention means a compound covalently combined though reaction of nylon 6,6 and a pyrene derivative (where g means grafting by a covalent bond).

DETAILED DESCRIPTION

Hereinafter, the present invention will be described in detail.

A thermoplastic polymer combined with a carbon nanomaterial according to the present invention comprises 0.1 to 15 wt % of a carbon nanomaterial, 0.025 to 30 wt % of a polycyclic aromatic hydrocarbon derivative, and 55 to 99.875 wt % of a thermoplastic polymer, wherein the carbon nanomaterial and the polycyclic aromatic hydrocarbon derivative are combined through π-π interaction and the polycyclic aromatic hydrocarbon derivative is covalently combined with the thermoplastic polymer.

The carbon nanomaterial, for example, may be at least one selected from the group consisting of single walled carbon nanotubes (SWCNT), double walled carbon nanotubes (DWCNT), multi-walled carbon nanotubes (MWCNTs), graphene, and carbon nano fibers.

In addition, in one embodiment, the carbon nanomaterial may be 0.1 to 10 wt %, or 0.1 to 5 wt %. Within this range, electrical conductivity and mechanical properties may be improved.

In one embodiment, the polycyclic aromatic hydrocarbon derivative has 2 to 5, 3 to 5, or 3 to 4 fused benzene rings. Within this range, the polycyclic aromatic hydrocarbon derivative has great improvement in π-π interaction with the carbon nanomaterial.

In one embodiment, the polycyclic aromatic hydrocarbon derivative comprises a functional group which may react with the polymer.

The functional group, for example, may be at least one selected from the group consisting of trialkyl azanium group, carboxylic acid groups, acylchloride groups, hydroxyl groups, amide groups, ester groups. Within this range, the functional group may react and covalently combine with a polymer.

In one embodiment, the polycyclic aromatic hydrocarbon derivative may be present in an amount of 0.1 to 10 wt %, or 0.1 to 5 wt %. Within this range, the polycyclic aromatic hydrocarbon derivative may effectively combine with a carbon nanomaterial.

In one embodiment, a weight ratio of the carbon nanomaterial to the polycyclic aromatic hydrocarbon derivative may be 1:0.1 to 1:1.5, 1:0.2 to 1:0.9, or 1:0.3 to 1:0.7. Within this range, tensile strength, tensile modulus and electrical conductivity are excellent.

The thermoplastic polymer, for example, may be at least one selected from the group consisting of amide-based polymers, ester-based polymers, acrylate-based polymers, polyketone-based polymers, vinyl-based polymers, styrene-based polymers, polyolefins, and polyphenylene ethers.

The amide-based polymers, for example, may be at least one selected from the group consisting of polyamide, polyimide, and polyetheresteramide.

The ester-based polymers, for example, may be at least one selected from the group consisting of polycarbonate, polyester, polybutylene terephthalate, polyethylene terephthalate, poly(ester) urethane, and polyether ester.

The acrylate-based polymers, for example, may be polyacrylate, polymethyl methacrylate, or a mixture thereof.

The polyketone-based polymers, for example, may be polyaryletherketone, polyetheretherketone, or a mixture thereof.

The vinyl-based polymers, for example, may be polyvinyl chloride, polyvinylidene fluoride, or a mixture thereof.

The styrene-based polymers, for example, may be at least one selected from the group consisting of polystyrene, styrene-butadiene-styrene copolymer, styrene-isoprene-styrene copolymer, styrene-ethylene-butadiene-styrene copolymer, and styrene-butadiene copolymer.

In addition, the thermoplastic polymer may be, for example, 40 to 99.9 wt %, 70 to 99.9 wt %, or 90 to 99.9 wt %. Within this range, mass production of extruding and injecting processes is excellent.

In one embodiment, the thermoplastic polymer combined with a carbon nanomaterial according to the present invention is an extrudate. In this case, the thermoplastic polymer is a master batch type and thus may be easily moved, and may be variously applied.

The method of preparing the thermoplastic polymer combined with the carbon nanomaterial according to the present invention comprises a) combining the carbon nanomaterial with a pyrene derivative by stirring 1 to 40 wt % of the carbon nanomaterial, 1 to 40 wt % of a polycyclic aromatic hydrocarbon derivative, and 20 to 98 wt % of a solvent, using a mechanical mixer; and b) coating the carbon nanomaterial combined with the polycyclic aromatic hydrocarbon derivative on a polymer pellet. In this case, a large-scale production may be easily carried out.

In one embodiment, step (a) may include combining the pyrene derivative with the carbon nanomaterial by stirring 10 to 30 wt % of the carbon nanomaterial, 10 to 30 wt % of the polycyclic aromatic hydrocarbon derivative, and 40 to 80 wt % of a solvent using a mechanical mixer. Within this range, the carbon nanomaterial may be uniformly coated with the polycyclic aromatic hydrocarbon derivative.

In addition, the method of preparing the thermoplastic polymer combined with the carbon nanomaterial according to the present invention comprises preparing a polymer pellet coated with a combined body of the polycyclic aromatic hydrocarbon derivative and the carbon nanomaterial by physically fixing i) 0.1 to 15 wt % of the carbon nanomaterial, ii) 0.025 to 30 wt % of the polycyclic aromatic hydrocarbon derivative, and iii) 10 to 99.775 wt % of a polymer pellet. In this case, large-scale production is possible and, during an extrusion process, easy addition may be carried out, when compared with adding the carbon nanomaterial in a dust state.

In one embodiment, the physical fixation may be carried out by stirring in a solution state.

In another embodiment, the physical fixation may be carried out by applying additional thermal energy to the solution state.

In another embodiment, the physical fixation may be carried out using oxygen plasma ($O_2$).

In yet another embodiment, the physical fixation may be carried out through ultrasonic wave mixing.

In addition, the physical fixation may be performed by stirring with a mechanical mixer to apply striking energy. In particular, by applying striking energy with the mechanical mixer, a large amount of the carbon nanomaterial may be uniformly fixed.

As a specific example, the mechanical mixer may be a mechanical mixer, a magnetic mixer, a homogenizer, a ball-mill, and any mixer types which may internally mix.

In another embodiment, the physical fixation is carried out using at least one solid-phase material selected from a zirconia ball, and a polymer pellet advantageously to apply striking energy.

The physical fixation may be carried out with or without a solvent.

The solvent, for example, may be 0.1 to 30 wt % or 0.1 to 20 wt %. Within this range, the combined body of the carbon nanomaterial is effectively coated on a polymer pellet. In this case, such that all ingredients of steps (i) to (iii) are 100 wt %, in step (iii), an amount of the polymer pellet may be 25 to 99.775 wt % or 35 to 99.775 wt %.

In step (i), a weight ratio of the carbon nanomaterial to the solvent, for example, may be 1:0.1 to 1:10, 1:0.5 to 1:8, or 1:2 to 1:5. Within this range, the combined body of the carbon nanomaterial may be effectively coated on the polymer pellet.

In one embodiment, the method of preparing the thermoplastic polymer combined with the carbon nanomaterial according to the present invention may further comprise melting and extruding the polymer pellet coated with the combined body of the polycyclic aromatic hydrocarbon derivative and the carbon nanomaterial. In this case, a master batch pellet, in which a carbon nanomaterial is highly dispersed, may be prepared and thus may be used in a variety of fields in which application of a carbon nanomaterial is required.

The carbon nanomaterial, for example, may be at least one selected from the group consisting of carbon nanotubes, graphene, and carbon nano fibers.

The polycyclic aromatic hydrocarbon derivative, for example, has 2 to 5, 3 to 5, or 3 to 4 fused benzene rings. Within this range, π-π interaction with the carbon nanomaterial is the most effective.

In one embodiment, the polycyclic aromatic hydrocarbon derivative comprises a functional group which may react with the polymer.

The functional group may be at least one selected from the group consisting of a trialkyl azanium group, a carboxylic acid group, an acylchloride group, a hydroxyl group, an amide group, an ester group. In this case, depending on the functional group types, a variety of thermoplastic polymers may covalently combine with the functional group under specific conditions.

The polycyclic aromatic hydrocarbon derivative, for example, may be at least one selected from the group consisting of 1-pyrene-butyrylcholine (PBC), 1-pyrene-butyric acid (1-pyrene-butyric acid; PBA) and other synthesizable pyrene polymers. In this case, depending on the polycyclic aromatic hydrocarbon derivative types, a variety of thermoplastic polymers may covalently combine with the polycyclic aromatic hydrocarbon derivative under a specific condition.

The thermoplastic polymer, for example, may be at least one selected from the group consisting of amide-based polymers, ester-based polymers, acrylate-based polymers, polyketone-based polymers, vinyl-based polymers, styrene-based polymers, polyolefins, and polyphenylene ethers, and specific examples thereof have been described above.

The polyamide, for example, may be at least one selected from the group consisting of nylon 4.6, nylon 6, nylon 6.6, nylon 6.10, nylon 7, nylon 8, nylon 9, nylon 11, nylon 12, nylon 46, MXD 6, amorphous polyamide, and copolymerized polyamide.

In one embodiment, the copolymerized polyamide is polymerized comprising two or more polyamide monomers of the other polyamides.

In one embodiment, the solvent may be an organic solvent or an inorganic solvent which does not dissolve the polymer pellet.

In another embodiment, the solvent may be at least one selected from the group consisting of water, ethanol, methanol, and THF. In this case, the carbon nanomaterial is easily dissolved while not dissolving amide-based polymers.

In another embodiment, the solvent may be at least one selected from the group consisting of chloroform, toluene, and benzene.

The thermoplastic polymer combined with the carbon nanomaterial according to the present invention is prepared in accordance with the method of preparing the thermoplastic polymer combined with the carbon nanomaterial according to the present invention.

Now, the present invention will be described in more detail with reference to the following examples. These examples are provided only for illustration of the present invention and should not be construed as limiting the scope and spirit of the present invention.

EXAMPLES

Specifications of each of ingredients and additives used in Examples and Comparative Examples below are as follows:
(A) Polyamide Resin
LUMID GP-1000B available from LG Chemical in Korea was used.
(B) Carbon Nanotube
As a multi-walled carbon nanotube (MWCNT) having an average outer diameter of 5 to 30 nm and an average length of 1 to 25 μm, NC-7000 available from Nanocyl was used.

Examples 1 to 2 and Comparative Examples 1 to 5

Each of ingredients and weights was mixed according to each mixing method as described Table 1 below and then was extruded with a polyamide resin at 280'C in a twin-screw extruder (L/D=42, Φ=40 mm), resulting in preparation of pellets. The prepared pellets were injected at an injection temperature of 280☐ in an injection machine, resulting in preparation of specimens.

The prepared specimens were incubated at 23☐, for 48 hours under a relative humidity of 50% and then properties and electrical conductivity thereof were measured according to American Standard Test Method (ASTM). Results are summarized in Table 1 below.

Covalent bonds of prepared pyrene derivatives and thermoplastic polymers were confirmed using ESCA (XPS). In this regard, the bonds of the pyrene derivatives and the polyamide were confirmed through an $N_{1s}$ peak by a bond of an amine group in the polyamide, or amide.

Example 3

A specimen was prepared in the same manner as in Example 1, except that, as a solvent, water was used instead of methanol. Properties and electrical conductivity of the prepared specimen are summarized in Table 2 below.

Test Example

Characteristics of specimens prepared according to Examples 1 to 3 and Comparative Examples 1 to 6 were measured according to methods below. Results are summarized in Tables 1 and 2 below.
- Preparation efficiency: an amount of a sample prepared through treatment per day was measured using each of a general laboratory-scale mechanical mixer (capacity: 4 kg) and ultrasonic wave treatment device (capacity: 500 g).
- Tensile strength, tensile modulus: tensile strength and tensile modulus of a specimen having a thickness of 3.2 mm were estimated according to ASTM D638.
- Surface specific resistance (Ω/Cm): using an SRM-100 available from PINION, surface resistance of a specimen was measured according to ASTM D257.
- Electromagnetic wave shield (dB): electromagnetic wave shielding performance of a 3 mm specimen was measured in a 1 GHz area according to ASTM D4935.

(Comparative Example 1 to 3) and the case of using a large amount of the solvent (Comparative Example 4).

In addition, it can be confirmed that the thermoplastic polymers combined with carbon nanomaterials (Examples 1 to 3) according to the present invention exhibit five times or more the preparation efficiency than the cases using an ultrasonic wave mixer (Comparative Example 5).

For reference, ultrasonic wave treatment devices have limitations in scale-up (capacity) thereof, unlike mechanical mixers. In addition, although the capacities of the ultrasonic wave treatment devices are increased, it may be difficult to uniformly stir due to characteristics of ultrasonic waves.

In addition, as Comparative Example 4, when a large amount of solvent is added, carbon nanomaterials agglomerate. Accordingly, it is difficult to induce uniform reaction with a polymer pellet, thereby reducing properties. In addition, when ultrasonic waves are used as in Comparative Example 5, lengths of carbon nanomaterials are reduced during an ultrasonic wave treatment process and thus tensile strength may be somewhat decreased.

TABLE 1

| | | Example | | Comparative Example | | | | |
|---|---|---|---|---|---|---|---|---|
| | | 1 | 2 | 1 | 2 | 3 | 4 | 5 |
| Ingredients | MWNT | | | | | | | ○ |
| | Pyrene derivatives | PBA | PBC | X | X | Pyrene | PBA | PBA |
| | Solvent (methanol) | ○ | ○ | ○ | ○ | ○ | Large amount | ○ |
| Mixing methods | Mixers | Mechanical type | | Mechanical type | | | | Ultrasonic waves |
| | Stirring time (h) | 12 | 12 | 12 | 12 | 12 | 12 | 12 |
| Properties | Preparation efficiency (kg/day) | 50 | 50 | 50 | 50 | 50 | 50 | 0.001 |
| | Tensile strength (MPa) | 1898 | 1899 | 1606 | 1686 | 1786 | 1607 | 1890 |
| | Tensile modulus (GPa) | 68 | 75 | 59 | 64 | 58 | 60 | 69 |
| | Surface specific resistance(Ω/cm) | $10^8$ | $10^8$ | $>10^{13}$ | $10^{10}$ | $10^9$ | $10^{10}$ | $10^8$ |
| | Electromagnetic wave shield (dB) | 8 | 8 | 0 | 4 | 6 | 5 | 8 |

(※ ○: used within an amount range according to the present invention, X: not used, Large amount: used in an amount range exceeding the amount range according to the present invention)

TABLE 2

| | | Example 3 |
|---|---|---|
| Ingredient | MWNT | ○ |
| | Pyrene derivative | PBA |
| | Solvent | Water |
| Mixing method | Mixer | Mechanical type |
| | Stirring time(h) | 12 |
| Properties | Preparation efficiency (kg/day) | 50 |
| | Tensile strength (MPa) | 1899 |
| | Tensile modulus (GPa) | 70 |
| | Surface specific resistance(Ω/cm) | $10^8$ |
| | Electromagnetic wave shielding (dB) | 8 |

As shown in Table 1, it can be confirmed that the thermoplastic polymers combined with the carbon nanomaterials (Examples 1 to 3) according to the present invention exhibit excellent effects in mechanical strength, electrical conductivity and electromagnetic wave shielding, when compared with the cases not containing pyrene derivatives

We claim:

1. A method of preparing a thermoplastic polymer combined with a carbon nanomaterial, the method comprising:
    stirring 1 to 40 wt % of a carbon nanomaterial, 1 to 40 wt % of a polycyclic aromatic hydrocarbon derivative, and 20 to 98 wt % of a solvent with a mechanical mixer; and
    coating a pellet of the thermoplastic polymer with the carbon nanomaterial combined with the polycyclic aromatic hydrocarbon derivative.

2. A method of preparing a thermoplastic polymer combined with a carbon nanomaterial, the method comprising preparing a pellet of the thermoplastic polymer coated with a combined body of a polycyclic aromatic hydrocarbon derivative and a carbon nanomaterial by stirring 0.1 to 15 wt % of the carbon nanomaterial, 0.025 to 30 wt % of the polycyclic aromatic hydrocarbon derivative, 10 to 99.775 wt % of the polymer pellet, and 0.1 to 45 wt % of a solvent.

3. The method according to claim 1, further comprising melting and extruding the coated polymer pellet.

4. The method according to claim 1, wherein the carbon nanomaterial is at least one selected from the group consisting of carbon nanotubes, graphene, and carbon nano fibers.

5. The method according to claim 1, wherein the polycyclic aromatic hydrocarbon derivative comprises 2 to 5 fused benzene rings.

6. The method according to claim 1, wherein the polycyclic aromatic hydrocarbon derivative comprises a functional group reacting with the polymer.

7. The method according to claim 6, wherein the functional group is at least one selected from the group consisting of trialkyl azanium groups, carboxylic acid groups, acylchloride groups, hydroxyl groups, amide groups, and ester groups.

8. The method according to claim 1, wherein the thermoplastic polymer is at least one selected from the group consisting of amide-based polymers, ester-based polymers, acrylate-based polymers, polyketone-based polymers, vinyl-based polymers, styrene-based polymers, polyolefins, and polyphenylene ethers.

9. The method according to claim 1, wherein the solvent is at least one selected from the group consisting of water, ethanol, methanol, and THF.

10. The method according to claim 1, wherein the solvent is at least one selected from the group consisting of chloroform, toluene, and benzene.

* * * * *